United States Patent Office 3,001,971
Patented Sept. 26, 1961

3,001,971
POLYESTERURETHANES
Harvey Scott and Glenn R. Moore, Akron, Ohio, assignors to The B. F. Goodrich Company, New York, N.Y., a corporation of New York
No Drawing. Filed Feb. 11, 1957, Ser. No. 639,234
13 Claims. (Cl. 260—47)

This invention relates to polyesterurethane polymers having improved weather resistant characteristics and relates more specifically to polyesterurethanes which are the reaction products of hydroxyl polyesters, alkoxy diols and aromatic diisocyanates.

Polyesterurethane polymers which are cross-linked or vulcanized and pigmented are considered to be relatively weather resistant. However, non-pigmented, non-vulcanized polyesterurethane polymers have been found to be adversely affected by sunlight and air. It is an object of this invention to provide improved polyesterurethanes which are resistant to degradation by sunlight and air, which improved polyesterurethanes may be employed in applications subject to weathering conditions without the need for cross-linking or using pigments. It is also another object of this invention to provide polyesterurethanes of improved weathering characteristics to make available superior vulcanized and pigmented compositions.

The present commercially available rubbery polyesterurethanes when exposed to ultra-violet radiation suffer severe loss in tensile strength and embrittlement of surface which cracks on stretching. By means of this invention we now provide polyesterurethane polymers which retain substantial original tensile strengths and do not become embrittled on the surface nor develop cracks on stretching after extended outdoor exposure or exposure to ultra-violet radiation.

The polyesterurethane products of the invention are the reaction products of essentially hydroxyl terminated polyesters, aromatic diisocyanates and certain hereinafter defined alkoxy diols. The ratio of polyester and alkoxy diol to aromatic diisocyanate is balanced so that there is essentially no free unreacted aromatic diisocyanate, alkoxy diol or polyester remaining after the reaction to form the elastomeric polyesterurethane products.

When the above conditions are observed, novel weather resistant polyesterurethane elastomer products are obtained which are crack resistant and which substantially retain the tensile strength of the original polymer upon exposure to sunlight or ultra-violet radiation and air and which have excellent physical properties including good abrasion resistance and resistance to hydrocarbons. These improved products may be readily processed and formed into useful articles including gloves, tubing and pipe, as wire coatings, and molded and extruded articles of any desired shape and form and are very useful in applications where weather resistance is required.

The polyesterurethanes are prepared by reacting together one mol equivalent of an essentially hydroxyl terminated aliphatic polyester and from about 0.5 to about five mol equivalents, preferably from about one to three mol equivalents, of a hereinafter defined alkoxy diol with from about 1.5 to about six mol equivalents, preferably from about two to four mol equivalents, of an aromatic diisocyanate. The ratio of reactants employed is such that there is used substantially an equivalent amount of aromatic diisocyanate to the molar amount of polyester and alkoxy diol. An excess less than 5% of any unreacted ingredient is preferred.

The polyester is an essentially hydroxyl terminated aliphatic polyester having a molecular weight between about 500 and 5000 and an acid number less than 10. More preferably the polyester has a molecular weight from about 750 to 3000 and an acid number less than 3. The polyester may be prepared by an esterification reaction of an aliphatic dibasic acid or an anhydride thereof with a glycol, by transesterification and the like. In direct esterification reactions, molar ratios of more than one mol of glycol to acid are preferred so as to obtain essentially linear chains containing a preponderance of terminal hydroxyl groups. The polyesters are preferably washed with water or treated with ion-exchange materials and dried prior to use.

The basic polyesters utilized include polyesters prepared, for example, by esterification with such aliphatic dicarboxylic acids as adipic, succinic, pimelic, suberic, azelaic, sebacic and the like or their anhydrides. Ordinarily the acids used are those dicarboxylic acids of the formula HOOC—R—COOH where R is an alkylene radical containing from 2 to 8 carbon atoms, more preferably from 4 to 6.

Any aliphatic diol may be utilized in the preparation of the polyester, by reaction for example with the aliphatic dicarboxylic acids. Alkylene glycols containing between 2 and 10 carbon atoms such as ethylene glycol, trimethylene diol, tetramethylene diol, hexamethylene diol, methyl pentamethylene diol, octamethylene diol and the like are generally preferred. Glycols of the formula HO—$(CH_2)_x$—OH where $x$ is from 4 to 6 are more preferred.

In the practice of the invention, and a necessary feature thereof in order to obtain products with improved weather resistance, the reaction between the polyester and aromatic diisocyanate takes place in the presence of an alkoxy diol in amount from about 0.5 to five mol equivalents per mol equivalent of polyester. Preferably the alkoxy diol is mixed with the polyester prior to reaction with the aromatic diisocyanate in amount from about one to three mols of alkoxy diol.

The alkoxy diols employed may be any aromatic diol in which the hydroxyl groups are attached to carbon atoms which are not attached by double bonds to another carbon atom, that is, alcoholic hydroxyl groups, and in which the hydroxyl groups are not attached directly to cyclic nuclei but are attached through alkoxy radicals. For example, hydroquinone contains non-alcoholic hydroxyls attached to carbon atoms possessing a double bond and is not satisfactory in making polymers in the present invention. In contrast thereto, use of 1,4-bis(2-hydroxy ethoxy) benzene of the formula

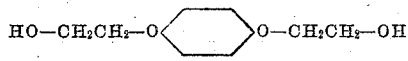

results in excellent products having outstanding weather resistant characteristics. Alkoxy diols of the following general formula are a valuable and preferred class of materials:

wherein A is an aliphatic radical including those containing from 1 to 10 carbon atoms such as, preferably, alkylene radicals containing from 2 to 6 carbon atoms, and Ar is aromatic, such as phenylene. Typical of such alkoxy hydroxy aromatic materials useful in the practice of the invention include 1,4-bis(2-hydroxy ethoxy) benzene; 1,4-bis(3-hydroxy butoxy) benzene; 4,4'-bis(2-hydroxy ethoxy) benzene-2-dimethyl methane; 4,4-bis(2-hydroxy ethoxy) biphenyl; 1,3-bis(2-hydroxy ethoxy) benzene; 1,4-bis(6-hydroxy hexoxy) benzene; 1,4-bis(3-hydroxy propoxy) benzene and like di(hydroxy alkoxy) aromatic compounds. Such materials are ordinarily prepared by condensing with ethylene or other alkylene chlorohydrins or alkylene oxides an appropriate dihydroxy compound including such materials as hydroquinone, catechol, resorcinol and materials of the general formula

wherein A is an aliphatic radical containing from 0 to 10 carbon atoms, and Ar is an aromatic or cyclic nucleus including phenyl, biphenyl, diphenyl methane and propane, and including phenyl dimethyldiol, phenyl diethanediol, phenyl dipropanediol, diphenyl diethanediol, naphthyl dimethyldiol and the like and diphenyl sulphone, diphenyl ether, naphthyl and the like.

It, thus, is seen that the aromatic alkoxy diol compound can have the following general formula:

HO—R'—O—[R"]—[Ar]—[R"]—O—R'—OH where R' is a saturated divalent aliphatic radical having from 1 to 10 carbon atoms, R" is a saturated divalent aliphatic radical having from 0 to 10 carbon atoms, and Ar is selected from the group consisting of —B—,

—B—B—, —B—R'"—B—, —B—O—B—,

—B—SO$_2$—B—, and —N— where B is a benzene residue, R'" is a lower saturated divalent aliphatic radical and N is a naphthylene residue.

The diisocyanates employed are aromatic diisocyanates and include such materials as dichlorodiphenyl methane diisocyanate, dimethyldiphenyl methane diisocyanate, diphenyldimethyl methane diisocyanate, bibenzyl diisocyanate, diphenyl ether diisocyanate, naphthylene diisocyanate, tolylene diisocyanate, bitolylene diisocyanate, para-phenylene diisocyanate, durene diisocyanate, dianisidene diisocyanate, meta-phenylene diisocyanate, tetrachlorophenylene diisocyanate, dimers of such diisocyanates and the like. Preferred for preparing polyesterurethane products of outstanding physical properties and outstanding weather resistance are meta-phenylene diisocyanate, durene diisocyanate, para-phenylene diisocyanate, tetrachloro-meta-phenylene diisocyanate, bitolylene diisocyanate and the like.

In the reaction to prepare the polyesterurethane products of the invention the reactants are mixed together at a temperature such that the three essential ingredients are melted together. Ordinarily a temperature of about 100° C.–120° C. is sufficient to obtain this state. Ordinarily the reaction is conducted in two stages, a first stage in a stirred reactor for a short period of time such as 1 to 5 minutes and then a second stage at a temperature of about 140–150° C., to obtain a reasonable reaction period, in a non-stirred reactor. This is ordinarily required since shortly after the initial reaction occurs, the mixture becomes so viscous as to be difficult to stir. If suitable mixing is obtained initially the reaction may be conducted in one stage.

The polyesterurethane products of the invention, although they are quite valuable when used as is, may, of course, be compounded in the usual manner for polyesterurethane elastomers, and pigments such as carbon black, silica, lignin, coloring agents, age resistors, plasticizers, fillers and the like may be added thereto. Further, the polyesterurethanes may be vulcanized and cross-linked through the use of additional amounts of organic polyisocyanates and the like as is well known to those skilled in the art and the resulting vulcanized or cross-linked products retain the improved weather resistance of the raw polyesterurethane elastomer and are thus enhanced.

The preparation and properties of the novel and improved products of this invention are set forth in more detail in the following examples.

*Example I*

A mixture of 0.1 mol of hydroxyl poly(tetramethylene adipate), molecular weight 984, and 0.130 mol of 1,4-bis(2-hydroxy ethoxy) benzene was melted in a kettle and stirred for about 20 minutes at a pressure of about 5 mm. at 100 to 110° C. To this mixture there was then added 0.23 mol of meta-phenylene diisocyanate. This mixture was stirred for 1 minute and was then poured into a lubricated container which is promptly sealed and the container placed in a 140° C. oven for about 4 hours.

At the end of this time the reaction product was cooled and there was obtained a clear snappy elastomer having a Shore A hardness of 92. This material can be milled satisfactorily, may be extruded to form elastic extrusions with very smooth surfaces and may be molded satisfactorily. When samples of this polyesterurethane are exposed for one week in an Atlas twin lamp type HVDL-X 220 volt 60 cycle carbon-arc weatherometer without the water spray, no surface embrittlement or cracks appear on stretching and there is no loss in tensile strength. A similar polymer made with 0.1 mol of the same polyester, 0.3 mol of 1,4-bis(2-hydroxy ethoxy) benzene and 0.4 mol of meta-phenylene diisocyanate had excellent rubbery properties, a Shore A hardness of 83 and this sample did not develop surface embrittlement nor cracks nor exhibit any loss in tensile strength after one week exposure in the weatherometer. These products also exhibit the same weather resistance after extended outdoor exposure. Both of these products had an original tensile strength of about 3000 p.s.i. These materials are particularly valuable as a wire coating material.

In contrast to these improved polymers, a polyesterurethane prepare with 0.1 mol of the same polyester, 0.15 mol of butanediol-1,4 in place of 1,4-bis(2-hydroxy ethoxy) benzene and 0.25 mol of meta-phenylene diisocyanate had an initial tensile strength of 3100 p.s.i and this sample melted when exposed in the weatherometer under the same conditions used for the two samples above. Another similar polyesterurethane prepared with 0.1 mol of the same polyester, 0.1 mol of butanediol-1,4 and 0.2 mol of meta-phenylene diisocyanate had an initial tensile strength of only about 1000 p.s.i. After exposure for one week in the weatherometer the tensile strength of the sample was only 150 p.s.i and test specimens exhibited badly embrittled and cracked surfaces.

*Example II*

When Example I was repeated with hydroxyl poly(tetramethylene adipate) and 1,4-bis(2-hydroxy ethoxy) benzene with durene diisocyanate, para-phenylene diisocyanate, tetrachloro-meta-phenylene diisocyanate and bitolylene diisocyanate substituted for meta-phenylene diisocyanate, similar elastomeric products were obtained having excellent ageing characteristics as shown by little or no loss in stress strain properties after an exposure of one week in the weatherometer and no surface embrittlement or cracking.

*Example III*

When Example I was repeated using hydroxyl poly(tetramethylene adipate) and meta-phenylene diisocyanate with 4,4'-bis(2-hydroxy ethoxy) diphenyl dimethyl methane; 1,3-bis(2-hydroxy ethoxy) benzene; 1,2-bis(2-hydroxy ethoxy) benzene; 1,4-bis(6-hydroxy hexoxy) benzene; and 1,4-bis(3-hydroxy propoxy) benzene, in place of 1,4-bis(2-hydroxy ethoxy) benzene; similar excellent weather resistant polyesterurethane elastomeric products were obtained. In each case no surface embrittlement or cracking of sample specimens was observed on testing after exposure in the weatherometer and the samples essentially retained their original tensile strength even after one week's exposure.

*Example IV*

0.1 mol of hydroxyl poly(ethylene adipate), molecular weight 2000, was melted with 0.2 mol of 1,4-bis(2-hydroxy ethoxy) benzene and this mixture reacted with 0.3 mol of meta-phenylene diisocyanate as described in Example I. The resulting product was a snappy elastomer having an initial tensile strength of about 5000 p.s.i., an elongation of 650%, a 300% modulus of 3000 p.s.i. and a Shore A hardness of 83. This polymer product had excellent abrasion resistance. After exposure in the weatherometer for one week, samples of this product exhibited no surface embrittlement or cracks and had lost less than 7% of the original tensile strength.

Example V 0.1 mol of hydroxyl poly(tetramethylene adipate), molecular weight 2664, and 0.175 mol of 1,4-bis(2-hydroxy ethoxy) benzene were melted together and reacted with 0.275 mol of meta-phenylene diisocyanate. This polyesterurethane product had excellent physical properties including an original tensile strength of 6700 p.s.i. After an exposure of one week in the weatherometer the surface of the sample specimens showed no evidence of embrittlement or cracking and the loss in tensile strength was less than 10%. A similar polymer made with hydroxyl poly(tetramethylene adipate) having a molecular weight 2115 had initial tensile strength 7150 p.s.i. and after ageing for one week in the weatherometer the sample specimens showed little loss in tensile strength and no surface embrittlement or cracking. These materials show no loss in tensile strength and no surface embrittlement or cracking after more than 3 months' outdoor exposure.

Example VI 0.1 mol of hydroxyl poly(tetramethylene succinate), molecular weight 1017, and 0.1 mol of 1,4-bis(2-hydroxy ethoxy) benzene were melted together and this mixture reacted with 0.2 mol of m-phenylene diisocyanate. The resulting tough polyesterurethane product had an initial tensile strength of about 3000 p.s.i. and after exposure of sample specimens in the weatherometer for one week, no evidence of cracking was noted and there was no loss in the tensile strength of the sample specimens.

We claim:

1. An improved weather resistant polyesterurethane comprising the reaction product of one mol equivalent of an essentially hydroxyl terminated saturated aliphatic polyester of an unsubstituted dicarboxylic acid having from 2 to 10 carbon atoms and an alkylene diol having from 2 to 10 carbon atoms, said polyester having a molecular weight of between about 500 and 5,000, an acid number of less than 10 and a plurality of ester groups in the main polymer chain, from about 1.0 to 5.0 mol equivalents of an aromatic dihydroxyl compound selected from the class consisting of 1,4-bis(2-hydroxy ethoxy) benzene, 4,4'-bis(2-hydroxy ethoxy)diphenyl dimethyl methane, 1,3-bis(2-hydroxy ethoxy)benzene, 1,2-bis(2-hydroxy ethoxy)benzene, 1,4-bis(6-hydroxy hexoxy)benzene, 1,4-bis(3-hydroxy propoxy)benzene, and 1,4-bis(3-hydroxy butoxy)benzene, and from about 2.0 to 6.0 mol equivalents of an aromatic diisocyanate selected from the class consisting of m-phenylene diisocyanate, p-phenylene diisocyanate, tetrachloro m-phenylene diisocyanate, durene diisocyanate, and bitolylene diisocyanate, the molar amount of said diisocyanate being substantially equivalent to the molar amount of said polyester and of said aromatic di-hydroxyl compound combined.

2. The method of making an improved weather resistant polyesterurethane comprising reacting together one mol equivalent of an essentially hydroxyl terminated saturated aliphatic polyester of an unsubstituted dicarboxylic acid having from 2 to 10 C atoms and an alkylene diol having from 2 to 10 C atoms said polyester having a molecular weight of between about 500 and 5,000, an acid number of less than 10 and a plurality of ester groups in the main polymer chain, from about 1.0 to 5.0 mol equivalents of an aromatic dihydroxyl compound selected from the class consisting of 1,4-bis(2-hydroxy ethoxy) benzene, 4,4'-bis(2-hydroxy ethoxy)diphenyl dimethyl methane, 1,3-bis(2-hydroxy ethoxy)benzene, 1,2-bis(2-hydroxy ethoxy)benzene, 1,4-bis(6-hydroxy hexoxy)benzene, 1,4-bis(3-hydroxy propoxy benzene, and 1,4-bis(3-hydroxy butoxy)benzene and from about 2.0 to 6.0 mol equivalents of an aromatic diisocyanate, selected from the class consisting of m-phenylene diisocyanate, p-phenylene diisocyanate, tetrachloro m-phenylene diisocyanate, durene diisocyanate, and bitolylene diisocyanate, the molar amount of said diisocyanate being substantially equivalent to the molar amount of said polyester and of said aromatic dihydroxyl compound combined.

3. An improved weather resistant polyesterurethane according to claim 1 where said polyester has a molecular weight of from about 750 to 3,000 and an acid number of less than 3 and where said aliphatic diol used in making said polyester is used in a molar amount in excess of said acid.

4. An improved weather resistant polyesterurethane according to claim 3 where said acid is a saturated unsubstituted acid having from 6 to 8 carbon atoms, where said aliphatic diol has the formula $HO-(CH_2)_x-OH$ where $x$ is a number from 4 to 6, where said aromatic alkoxy diol is used in an amount of from about 1 to 3 mol equivalents, where said diisocyanate is used in an amount of from about 2 to 4 mol equivalents and where said polyesterurethane is essentially free of unreacted polyester, aromatic alkoxy diol and diisocyanate at the end of said reaction.

5. An improved weather resistant polyesterurethane according to claim 1 in which said aromatic dihydroxyl compound comprises 1,4-bis(2-hydroxy ethoxy)benzene.

6. An improved weather resistant polyesterurethane according to claim 1 in which said aromatic dihydroxyl compound comprises 1,3-bis(2-hydroxy ethoxy) benzene.

7. An improved weather resistant polyesterurethane according to claim 1 in which said aromatic dihydroxyl compound comprises 4,4'-bis(2-hydroxy ethoxy) benzene-2-dimethyl methane.

8. An improved weather resistant polyesterurethane according to claim 1 in which said aromatic dihydroxyl compound comprises 1,4-bis(3-hydroxy propoxy) benzene.

9. The method according to claim 2 where said polyester has a molecular weight of from about 750 to 3,000 and an acid number of less than 3 and where said aliphatic diol used in making said polyester is used in a molar amount in excess of said acid.

10. The method according to claim 9 where said acid is a saturated unsubstituted acid having from 6 to 8 carbon atoms, where said aliphatic diol has the formula $HO-(CH_2)_x-OH$ where $x$ is a number from 4 to 6, where said aliphatic alkoxy diol is used in an amount of from about 1 to 3 mol equivalents, where said diisocyanate is used in an amount of from about 2 to 4 mol equivalents and where said polyesterurethane is essentially free of unreacted polyester, aromatic alkoxy diol and diisocyanate at the end of said reaction.

11. The method according to claim 2 in which said aromatic dihydroxyl compound comprises 1,4-bis(6-hydroxy hexoxy) benzene.

12. The method according to claim 2 in which said aromatic dihydroxyl compound comprises 1,4-bis(3-hydroxy butoxy) benzene.

13. The method according to claim 2 in which said aromatic dihydroxyl compound comprises 1,4-bis(2-hydroxy ethoxy) benzene.

References Cited in the file of this patent

UNITED STATES PATENTS

| | | |
|---|---|---|
| 2,729,618 | Muller et al. | Jan. 3, 1956 |
| 2,861,972 | Muller et al. | Nov. 25, 1958 |
| 2,871,218 | Schollenberger | Jan. 27, 1959 |

FOREIGN PATENTS

| | | |
|---|---|---|
| 775,779 | Great Britain | Aug. 29, 1956 |
| 1,101,560 | France | Apr. 20, 1955 |

OTHER REFERENCES

Bayer: Modern Plastics, June 1947, pp. 149–152, 250, 252, 254, 256, 258, 260 and 262.

Bayer: Angewandte Chemie, 59, No. 9, pp. 257–288, September 1947.